US011500455B2

(12) United States Patent
Ran et al.

(10) Patent No.: US 11,500,455 B2
(45) Date of Patent: Nov. 15, 2022

(54) VIDEO STREAMING SYSTEM, VIDEO STREAMING METHOD AND APPARATUS

(71) Applicant: NOLO CO., LTD, Beijing (CN)

(72) Inventors: Ruiyuan Ran, Beijing (CN); Jianing Zhang, Beijing (CN); Daoning Zhang, Beijing (CN)

(73) Assignee: Nolo Co., Ltd., Beijing (CN)

( * ) Notice: Subject to any disclaimer, the term of this patent is extended or adjusted under 35 U.S.C. 154(b) by 0 days.

(21) Appl. No.: 17/286,387

(22) PCT Filed: Oct. 15, 2019

(86) PCT No.: PCT/CN2019/111315
§ 371 (c)(1),
(2) Date: Apr. 16, 2021

(87) PCT Pub. No.: WO2020/078354
PCT Pub. Date: Apr. 23, 2020

(65) Prior Publication Data
US 2021/0357020 A1    Nov. 18, 2021

(30) Foreign Application Priority Data

Oct. 16, 2018  (CN) .......................... 201811202640.5
Oct. 16, 2018  (CN) .......................... 201811203090.9
Oct. 16, 2018  (CN) .......................... 201811203106.6

(51) Int. Cl.
*G06F 3/01*     (2006.01)
*H04L 29/06*    (2006.01)
(Continued)

(52) U.S. Cl.
CPC .............. *G06F 3/011* (2013.01); *H04L 65/61* (2022.05); *H04L 67/131* (2022.05)

(58) Field of Classification Search
CPC ....... G06F 3/011; H04L 65/4069; H04L 67/38
See application file for complete search history.

(56) References Cited

U.S. PATENT DOCUMENTS

2008/0209048 A1* 8/2008 Sampath ................. H04L 67/14
                                                      709/227
2011/0317921 A1   12/2011 Tsukagoshi
(Continued)

FOREIGN PATENT DOCUMENTS

CN    104035760 A    9/2014
CN    105452935 A    3/2016
(Continued)

OTHER PUBLICATIONS

International Search Report for PCT/CN2019/111315, completed Dec. 17, 2019, dated Jan. 2, 2020; ISA/CN: China National Intellectual Property Administration; Beijing, China.
(Continued)

*Primary Examiner* — Lixi C Simpson
(74) *Attorney, Agent, or Firm* — David B. Tingey; Bryant J. Keller; Kirton McConkie (57) ABSTRACT

Provided are a video streaming system, and a corresponding video streaming method and video streaming apparatus. The video streaming system includes a terminal and a VR device. Application platform software and server streaming software are installed on the terminal. Client streaming software is installed on the VR device, the client streaming software is configured to send posture data to the server streaming software on the terminal, the server streaming software is configured to send the posture data to the application platform software, and the application platform software is configured to render a picture. The hardware configuration of the terminal itself is utilized for picture processing, and satisfactory pictures can be obtained on the screen of the VR device. On the other hand, the picture is rendered according to prediction positioning data/prediction posture data, thereby effectively reducing picture jitter and display delay.

6 Claims, 6 Drawing Sheets

(51) Int. Cl.
*H04L 65/61* (2022.01)
*H04L 67/131* (2022.01)

(56) References Cited

U.S. PATENT DOCUMENTS

| | | | |
|---|---|---|---|
| 2013/0117377 A1 | 5/2013 | Miller | |
| 2017/0186231 A1 | 6/2017 | Petrov | |
| 2018/0047332 A1* | 2/2018 | Kuwahara | G06F 3/147 |
| 2019/0243472 A1* | 8/2019 | Stafford | G06F 3/0383 |
| 2019/0251892 A1* | 8/2019 | Stoll | G06F 3/011 |
| 2020/0126280 A1* | 4/2020 | Amimoto | G06T 11/60 |

FOREIGN PATENT DOCUMENTS

| | | |
|---|---|---|
| CN | 106383596 A | 2/2017 |
| CN | 106454322 A | 2/2017 |
| CN | 106710002 A | 5/2017 |
| CN | 106899860 A | 6/2017 |
| CN | 106998409 A | 8/2017 |
| CN | 107024995 A | 8/2017 |
| CN | 206541288 U | 10/2017 |
| CN | 107315470 A | 11/2017 |
| CN | 107577045 A | 1/2018 |
| CN | 107943287 A | 4/2018 |
| CN | 107979763 A | 5/2018 |
| CN | 108052364 A | 5/2018 |
| CN | 108111839 A | 6/2018 |
| CN | 201811203090.9 | 10/2018 |

OTHER PUBLICATIONS

First Search of CN Prior Application CN201811202640.5; dated Oct. 16, 2018.
First Search of CN Prior Application CN201811203090.9; dated Oct. 16, 2018.
First Search of CN Prior Application CN201811203106.6; dated Oct. 16, 2018.
First Office Action of CN Prior Application CN201811202640.5; dated Sep. 2, 2020.
First Office Action of CN Prior Application CN201811203090.9; dated Sep. 2, 2020.
First Office Action of CN Prior Application CN201811203106.6; dated Sep. 16, 2020.
Second Office Action of CN Prior Application CN201811202640.5; dated Feb. 25, 2021.
Second Office Action of CN Prior Application CN201811203106.6; dated Apr. 6, 2021.

* cited by examiner

VIDEO STREAMING SYSTEM, VIDEO STREAMING METHOD AND APPARATUS

CROSS-REFERENCE TO RELATED APPLICATION(S)

This is a national stage application filed under 37 U.S.C. 371 based on International Patent Application No. PCT/CN2019/111315, filed Oct. 15, 2019, which claims priority to Chinese Patent Applications No. 201811202640.5 filed Oct. 16, 2018, No. 201811203090.9 filed Oct. 16, 2018 and No. 201811203106.6 filed Oct. 16, 2018, the disclosures of which are incorporated herein by reference in their entireties.

TECHNICAL FIELD

The present disclosure relates to a video streaming system, a video streaming method and a video streaming apparatus, which belong to the technical field of virtual reality.

BACKGROUND

Video streaming refers to a video playing technology by which a series of video data are compressed and the compressed video data are transmitted in segments, and video and audio are instantly transmitted on the network for watching. Players such as QuickTime Player and Real Player which were popular adopt the video streaming technology. At present, with the further development of industries such as online games, live games and the like, the video streaming has been widely used. However, the existing VR device has insufficient support for the video streaming, which is prone to many problems such as picture delay and picture jitter.

SUMMARY

For shortcomings in the existing art, a primary technical problem to be solved by the present disclosure is to provide a video streaming system.

Another technical problem to be solved by the present disclosure is to provide a video streaming method.

Another technical problem to be solved by the present disclosure is to provide a video streaming apparatus.

To achieve the above purposes, the present disclosure adopts the following technical solution.

In a first aspect of an embodiment of the present disclosure, a video streaming system is provided. The system includes a terminal and a VR device.

Application platform software and server streaming software are installed on the terminal.

Client streaming software is installed on the VR device, the client streaming software is configured to send posture data to the server streaming software on the terminal, the server streaming software is configured to send the posture data to the application platform software, and the application platform software is configured to render a picture.

Optionally, the system includes a positioning and tracking device.

The positioning and tracking device is configured to capture positioning data and to send the positioning data to the VR device.

The client streaming software is configured to send the posture data and the positioning data to the server streaming software on the terminal, the server streaming software is configured to send the posture data and the positioning data to the application platform software, and the application platform software is configured to render a picture.

Optionally, the server streaming software includes a control interface and a server driver, where the server driver is configured to be loaded on the terminal when the application platform software is started on the terminal.

Optionally, the client streaming software is configured to send the posture data and/or the positioning data to the server streaming software wirelessly.

Optionally, the server streaming software includes a server driver; a positioning and prediction unit is in the server driver and is configured to obtain prediction positioning data/prediction posture data according to the positioning data/the posture data sent by the VR device.

In a second aspect of an embodiment of the present disclosure, a video streaming method is provided. The method includes steps described below.

Posture data of a VR device is acquired.

Acquired posture data is sent to VR application software so that the VR application software renders a picture.

A rendered picture is acquired and the rendered picture is sent to the VR device so that the VR device displays the rendered picture.

In a third aspect of an embodiment of the present disclosure, a video streaming method is provided. The method includes steps described below.

Posture data and positioning data are acquired.

Acquired posture data and acquired positioning data are sent to VR application software so that the VR application software renders a picture.

A rendered picture is acquired and the rendered picture is sent to a VR device so that the VR device displays the rendered picture.

In a fourth aspect of an embodiment of the present disclosure, a video streaming method is provided. The method includes steps described below.

Posture data of a VR device is acquired.

Prediction posture data is obtained according to acquired posture data.

The prediction posture data is sent to VR application software so that the VR application software renders a picture.

A rendered picture is acquired and the rendered picture is sent to the VR device so that the VR device displays the rendered picture.

In a fifth aspect of an embodiment of the present disclosure, a video streaming method is provided. The method includes steps described below.

Positioning data captured by a positioning and tracking device is acquired.

Prediction positioning data is obtained according to acquired positioning data.

The prediction positioning data is sent to application platform software so that the application platform software renders a picture.

A rendered picture is acquired and the rendered picture is sent to the VR device so that the VR device displays the rendered picture.

In a sixth aspect of an embodiment of the present disclosure, a video streaming apparatus is provided. The video streaming apparatus includes a processor and a memory, where the processor is configured to execute a program which is used for implementing the video streaming and is stored in the memory to implement the video streaming method.

With the present disclosure, on the one hand, the VR application software can merely run on the terminal, and the VR device is merely responsible for displaying the picture. In this way, the hardware configuration of the terminal itself is fully utilized for picture processing, and satisfactory pictures can be obtained on the screen of the VR device. On the other hand, by calculating the data delay time of the positioning data/posture data received by the server streaming software, combining the positioning data/posture data sent by the VR device, the positioning data/posture data is predicted when the application platform software performs picture rendering, and according to the prediction positioning data/prediction posture data, the picture rendering is performed, so that picture jitter and display delay can be effectively reduced.

DETAILED DESCRIPTION

Technical contents of the present disclosure is described in detail below in conjunction with drawings and specific embodiments.

First Embodiment

Figure 1:
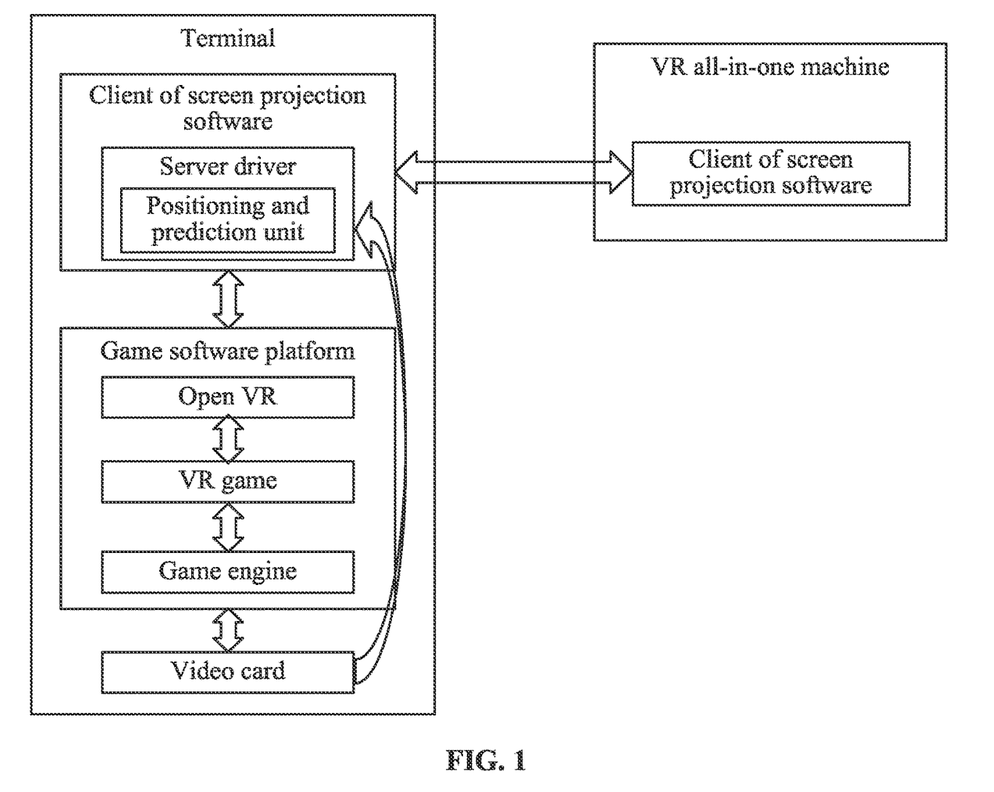
FIG. 1 is a schematic diagram illustrating a structure of a video streaming system in a first embodiment of the present disclosure.

As shown in FIG. 1, a video streaming system in an embodiment of the present disclosure includes a terminal and a VR device (such as a VR all-in-one machine and the like). Application platform software and server streaming software are installed on the terminal.

In the embodiment of the present disclosure, the terminal may be illustrated by using a personal computer (PC) as an example, and may be a tablet computer, a smart TV, a smart phone or the like having data processing capabilities. Exemplarily, the application platform software installed on the PC is Steam VR platform software (which may be a corresponding APP on the smart phone), or may also be other application platforms such as a VIVEPORT platform, a HYPEREAL platform, an Ant Vision VR application software platform, a Dapeng Assistant, a Tencent WEGAME, an OGP application platform and the like. The VR application software in the application platform software uses an application engine (such as an Unreal Engine 4, a Universal 3D and the like) and integrates an SDK provided by a data interface OpenVR, such as the SDK provided by the data interface OpenVR of the Steam VR platform software, so that the picture of the VR application software can be seen on the displayer of the PC. The server streaming software can be configured to be an A end of NOLOHOME software.

The server streaming software includes two parts. One of the two parts is a control interface and the other of the two parts is a server driver. The server driver is optionally a dll file, and can also be another implementation form, such as the SDK, an API file and the like. When the application platform software such as Steam VR platform software, is started on the PC, the above server driver is loaded accordingly.

Client streaming software is installed on the VR device, for example, the client streaming software can be configured to be a B end of the NOLOHOME software. The VR device is installed with various sensors such as a nine-shaft sensor, an inertia sensor or the like, which can sense posture movements such as pitching, rolling and yawing. The VR device sends posture data of the VR device to the server streaming software on the PC through the client streaming software, and sends the posture data to the application platform software through the server streaming software on the PC so that the application platform software renders real-time pictures. In an embodiment shown in FIG. 1, the VR device may be a VR all-in-one machine, the client streaming software is installed in a system of the VR all-in-one machine, the pictures are also displayed on the display screen of the VR all-in-one machine, and the sensor is fixedly installed on the VR all-in-one machine. In other embodiments, the VR device may also be a mobile VR device, the client streaming software is installed in the smart phone of the mobile VR device, and the pictures can be displayed on the smart phone of the mobile VR device or on the display screen of the mobile VR device. The sensor may be fixedly installed on a shell of the mobile VR device or be a sensor borrowed from the smart phone installed in the mobile VR device.

The PC and the VR device are connected in a wired/wireless way. When the PC and the VR device are connected wirelessly, optionally, the PC and the VR device operate in a wireless local area network (WLAN) or a fifth-generation (5G) communication environment. Since 5G communication environment has characteristics of high speed and low delay, an actual delay generated by the PC and the VR device in the 5G communication environment can be basically negligible.

To enable the picture of the VR application software to be streamed into the VR device, in the streaming system shown in FIG. 1, several core modules required to be implemented are: the server driver on the server streaming software, the VR device, and the client streaming software installed on the VR device. The VR device is configured to acquire the posture data of the VR device itself. The client streaming software and the server driver are configured to perform data transmission and processing.

Figure 2:
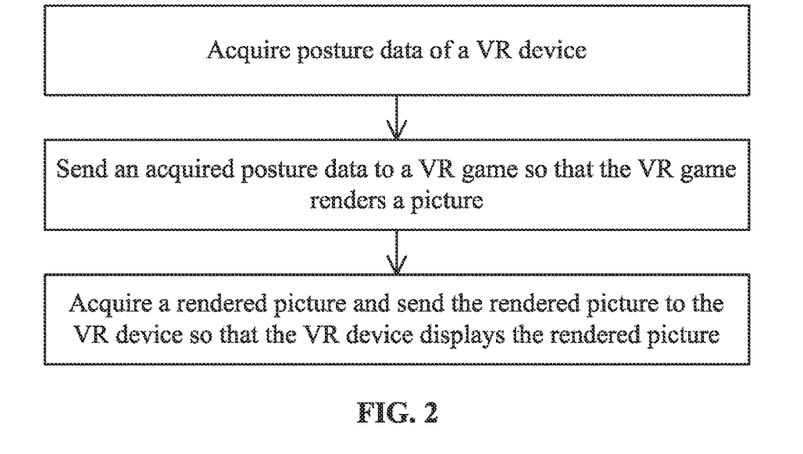
FIG. 2 is a flowchart of a video streaming method in a first embodiment of the present disclosure.

FIG. 2 is a flowchart of a video streaming method provided by the first embodiment. The video streaming method includes steps described below. Client streaming software is started on a VR device, such as a B end of NOLOHOME software, and server streaming software is started on a PC, such as an A end of NOLOHOME software. A control interface UI of the server streaming software includes various control keys. The streaming software is started through the control keys to connect the A end and the B end. The VR device can send data such as posture and control information to the server driver of the server streaming software on the PC through the client streaming software. The server driver processes the received data and sends the processed data to the application platform software so that the application platform software renders the picture. The server driver sends the rendered picture to the VR device so that the VR device displays the picture, which is explained in detail below.

In S1, the posture data of the VR device is acquired.

The posture data of the VR device is acquired by a sensor installed on the VR device, such as a nine-shaft sensor, an inertial sensor, a six-shaft sensor, a gyroscope, a magnetometer and the like.

The posture data of the VR device is transmitted to the client streaming software installed on the VR device, and then is sent to the server driver of the server streaming software by using a user datagram protocol (UDP) through the client streaming software. The UDP is a connectionless transport layer protocol in an open system interconnection reference model, and provides transaction-oriented simple and unreliable information transmission services. After this step, the server streaming software acquires the posture data of the VR device.

Optionally, control information of the VR device can also be acquired, and the control information of the VR device can also be sent to the server driver of the server streaming software by using the UDP through the client streaming software.

In S2, the acquired posture data is sent to the VR application software so that the VR application software renders the picture.

In the embodiment of the present disclosure, the following steps are specifically included in S2.

In S21, the acquired posture data of the VR device is sent to a data interface and the acquired posture data is transmitted to the VR application software via the data interface.

The posture data acquired by the server driver of the server streaming software is transmitted to the data interface. For the VR application software in the application platform software SteamVR, the application engine is used and the SDK provided by the data interface OpenVR is integrated, and the OpenVR can transmit the posture data to the VR application software.

Optionally, the control information of the VR device acquired by the server driver of the server streaming software is also transmitted to the VR application software so that the VR application software renders the picture. The control information acquired by the server streaming software is sent to the data interface and transmitted to the VR application software through the data interface.

In S22, the picture is rendered through the application engine according to the posture data obtained by the VR application software and an application logic.

The VR application software transmits data, according to the obtained posture data and the application logic, to the application engine to obtain the exact rendered picture contents and render the picture. The application engine is an Unreal Engine 4, or a Universal 3D or the like.

Optionally, the VR application software also transmits data, according to the obtained control information, to the application engine to obtain the exact rendered picture contents and render the picture.

In S23, data rendered by the application engine is stored in a video memory of a video card.

In the embodiment of the present disclosure, the application engine stores the rendered data in the video memory of the video card, such as the video memory of a Nvidia video card, and notifies the VR application software that the picture has been rendered, the VR application software notifies the data interface OpenVR, and the data interface OpenVR notifies the server driver of the server streaming software that an event of rendering is completed.

In S3, a rendered picture is acquired and the rendered picture is sent to the VR device so that the VR device displays the rendered picture.

In the embodiment of the present disclosure, the following steps are specifically included in S3.

In S31, texture data corresponding to the rendered picture is acquired, and one frame of the picture is coded into multiple data packets.

When the server driver of the server streaming software is notified that the event that rendering is completed, the server driver finds the corresponding texture data in the video memory through a texture address transmitted by the OpenVR, i.e., data of one frame of the picture, and the one frame of the picture is coded into multiple data packets.

In the embodiment of the present disclosure, a dedicated library for video coding and decoding provided by Avida, which is an NvCodec library, is adopted. When initializing, the NvCodec library are notified of the coding format and the picture format in advance. In an embodiment of the present disclosure, the data is coded by using an H. 264 standard. As for the picture format, pictures in an NV_ENC_BUFFERFORMAT_ABGR format are used, in a current frame, and the NvCodec library codes one frame of the picture into multiple small data packets as required.

In S32, the multiple coded data packets are sent to the VR device for decoding and displaying.

When the coding is finished, the server driver of the server streaming software sends the multiple coded data packets to the client streaming software installed on the VR device, and then the client streaming software transmits the coded data packets to the VR device. After the VR device receives the data of one complete frame, the VR device decodes the received data packets to form a complete picture on the VR device and displays the picture.

The method of the VR device displaying the picture and related hardware can adopt any existing method and hardware, and no specific requirement is made here.

To sum up, the video streaming method provided by the above embodiment firstly acquires the posture data and the control information of the VR device by the server streaming software. The acquired posture data and control information are sent to the VR application software so that the VR application software renders the picture. The rendered picture is acquired and sent to the VR device so that the VR device displays the picture. The server streaming software is installed on the terminal. The method enables the terminal to be responsible for running the VR application software, and the VR device is merely responsible for the picture display. Therefore, through the hardware configuration of the terminal itself, the picture processing can be performed and satisfactory pictures can be obtained on the screen of the VR device. Moreover, by wirelessly connecting the terminal to the VR device by a 5G router, the technical problem of "VR wireless" that puzzles many manufacturers is solved.

Second Embodiment

Figure 3:
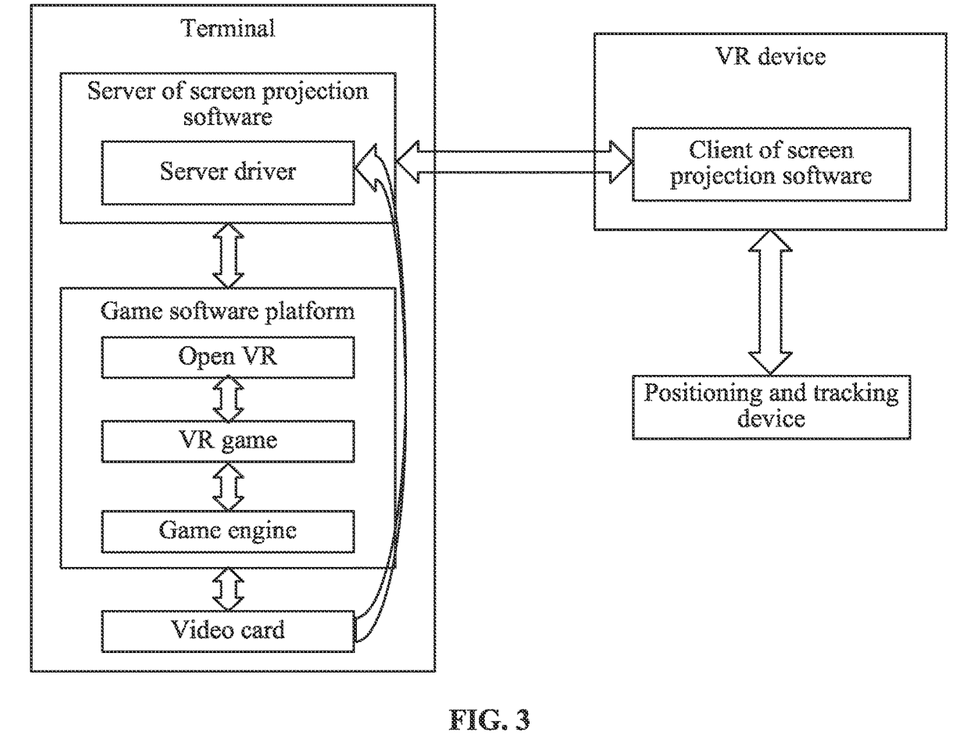
FIG. 3 is a schematic diagram illustrating a structure of a video streaming system in a second embodiment of the present disclosure.

As shown in FIG. 3, the video streaming system in the second embodiment of the present disclosure includes a terminal, a VR device, and a positioning and tracking device. Application platform software and server streaming software are installed on the terminal. In the embodiment of the present disclosure, the terminal is illustrated by taking a PC as an example, and the terminal may also be a tablet computer, a smart TV, a smart phone and the like having data processing capabilities. Exemplarily, the application platform software installed on the PC is Steam VR platform software (or a corresponding APP on the smart phone), or may also be other application platforms such as a VIVEPORT platform, a HYPEREAL platform, an Ant Vision VR application software platform, a Dapeng Assistant, a Tencent WEGAME, an OGP application platform and the like. The VR application software in the application platform software uses an application engine (such as an Unreal Engine 4, a Universal 3D and the like) and integrates an SDK provided by a data interface OpenVR, such as the SDK provided by the data interface OpenVR of the Steam VR platform software, so that the picture of the application can be seen on the displayer of the PC. Exemplarily, the server streaming software may be configured to be an A end of NOLOHOME software.

The server streaming software includes two parts. One of the two parts is a control interface and the other of the two parts is a server driver. The server driver is optionally a dll file, and may also be another implementation form, such as the SDK, an API file and the like. When the application platform software such as Steam VR platform software, is started on the PC, the above server driver is loaded accordingly.

Client streaming software is installed on the VR device, for example, the client streaming software may be configured to be a B end of the NOLOHOME software. The VR device may be a VR all-in-one machine, the client streaming software is installed in a system of the VR all-in-one machine, the pictures are also displayed on the display screen of the VR all-in-one machine, and the sensor is fixedly installed on the VR all-in-one machine. The VR device may also be a mobile VR device, the client streaming software is installed in the smart phone of the mobile VR device, and the pictures can be displayed on the smart phone of the mobile VR device or on the display screen of the mobile VR device. The sensor may be fixedly installed on a shell of the mobile VR device or be a sensor borrowed from the smart phone installed in the mobile VR device.

The PC and the VR device are connected in a wired/wireless way. When the PC and the VR device are connected wirelessly, optionally, the PC and the VR device operate in a wireless local area network (WLAN) or a fifth-generation (5G) communication environment. Since 5G communication environment has characteristics of high speed and low delay, an actual delay generated by the PC and the VR device in the 5G communication environment can be basically negligible.

In the existing art, most VR devices only can watch videos, that is, most VR devices only have three degree-of-freedom posture tracking (pitching, rolling and yawing). If six degree-of-freedom head-hand position positioning (including pitching, rolling, yawing and spatial X, Y and Z coordinates) needs to be performed, a positioning and tracking device needs to be equipped. The positioning and tracking device is configured to track a position of a user, for example, the positioning and tracking device may include a handle held in a user's hand to track a position of the user's hand; a locator installed on the VR device internally or externally to track a position of the user's head. The handle can transmit positioning data to the locator, and then the locator transmits the positioning data of the locator and the positioning data of the handle to the VR device, or both the handle and the locator directly transmit the positioning data to the VR device.

The VR device acquires the positioning data captured by the positioning and tracking device, acquires the posture data of the positioning and tracking device and the posture data of the VR device itself, and then uses the client streaming software to send the positioning data and the posture data to the server streaming software on the terminal by using an UDP. The server streaming software on the terminal sends the positioning data and the posture data to the application platform software, so that the application platform software renders a real-time picture.

To enable the picture of the VR application software to be streamed into the VR device, such requirement is realized according to a system architecture shown in FIG. 3, in the video streaming system shown in FIG. 3, several core modules required to be implemented are: the server driver on the server streaming software, the VR device, the client streaming software installed on the VR device and the positioning and tracking device. The positioning and tracking device is configured to acquire the positioning data and the posture data of a user's body. The VR device is configured to acquire the positioning data and the posture data and transmit the data to the server driver. The client streaming software and the server driver are configured to perform data transmission and processing.

Figure 4:
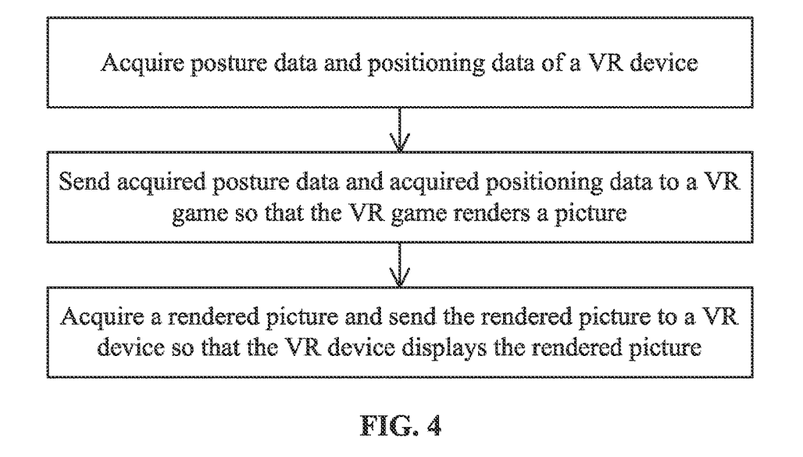
FIG. 4 is a flowchart of a video streaming method in a second embodiment of the present disclosure.

FIG. 4 is a flowchart of a video streaming method in a second embodiment of the present disclosure. The video streaming method includes steps described below. Client streaming software, such as a B end of NOLOHOME software, is started on a VR device, and server streaming software, such as an A end of NOLOHOME software, is started on a PC. A control interface UI of the server streaming software includes various control keys. The streaming software is started through the control keys to connect the A end and the B end. The client streaming software of the VR device can send data such as posture data, control information and positioning data to the server driver of the server streaming software on the PC. The server driver processes the received data and sends the processed data to the application platform software so that the application platform software renders the picture. The server driver sends the rendered picture to the VR device so that the VR device displays the picture, which is explained in detail below.

In S1, the posture data and the positioning data are acquired.

The step in which the posture data and the positioning data are acquired includes steps described below.

In S11, posture data and/or positioning data of a user are acquired through positioning and tracking device.

The positioning and tracking device may include a locator installed on the VR device, and a handle held on the user's hand and the like. By obtaining the positioning data of the locator and/or the handle, the positioning data of the user's head and/or hand can be obtained. The positioning data of the user may be obtained through a three-dimensional spatial positioning method and system disclosed by a patent application No. 201610917518.0, and may also be obtained by using another known three-dimensional spatial positioning method and system.

The posture data of the user's head may be obtained by a sensor installed on the VR device or by a sensor installed on the locator on the VR device, such sensor may be a nine-shaft sensor, an inertial sensor, a six-shaft sensor, a gyroscope, a magnetometer and the like. The posture data of other parts of the user, such as the hand, is obtained by the sensor installed on the handle of the positioning and tracking device.

In S12, the captured posture data and the captured positioning data are sent to the VR device.

The VR device may read the posture data and the positioning data in a wired way such as through an OTG data line, and may also read the posture data and the positioning data in a wireless way such as through Bluetooth and WiFi. As for a VR all-in-one machine, the data is directly sent to a system of the VR all-in-one machine. As for a mobile VR device, the data may be sent to a smart phone installed in a housing of the mobile VR device.

In S13, the acquired posture data and the acquired positioning data are sent to the server streaming software.

The VR device transmits the acquired posture data and the acquired positioning data to the client streaming software installed on the VR device, and then sends the acquired posture data and the acquired positioning data to the server driver of the server streaming software installed on the terminal in a 5G wireless manner by using an UDP. After this step, the server streaming software acquires the positioning data and the posture data.

Optionally, the server streaming software may also acquire control information, and the control information may also be sent to the server driver of the server streaming software by using the UDP through the client streaming software. The control information may come from the VR device or the positioning and tracking device.

In S2, the acquired posture data and the acquired positioning data are sent to the VR application software so that the VR application software renders the picture. The step specifically includes steps described below.

In S21, the acquired posture data and the acquired positioning data are sent to a data interface and transmitted to the VR application software through the data interface.

The posture data and positioning data acquired by the server driver of the server streaming software are transmitted to the data interface. For the VR application software in the application platform software SteamVR, the application engine is used, the SDK provided by the data interface OpenVR is intergrated, and the data interface OpenVR can transmit the posture data and the positioning data to the VR application software.

Optionally, the control information acquired by the server driver of the server streaming software is also transmitted to the VR application software. The control information acquired by the server driver of the server streaming software is sent to the data interface OpenVR and transmitted to the VR application software through the data interface OpenVR.

In S22, the picture is rendered through the application engine according to the positioning data, the posture data obtained by the VR application software and an application logic.

The VR application software transmits, according to the obtained positioning data, the posture data and the application logic, the exact rendered picture contents to the application engine and renders the picture. The application engine is an Unreal Engine 4, or a Universal 3D, or the like.

Optionally, the VR application software also transmits the obtained control information to the application engine, so that the exact rendered picture contents are obtained, and the picture is rendered.

In S23, data rendered by the application engine is stored in a video memory of a video card.

In the embodiment of the present disclosure, the data rendered by the application engine is stored in the video memory of the video card, and the VR application software is notified that the picture has been rendered, the VR application software notifies the data interface, and the data interface notifies the server driver of the server streaming software that an event of rendering is completed.

In S3, the rendered picture is acquired and sent to the VR device so that the VR device displays the rendered picture.

In the embodiment of the present disclosure, the following steps are specifically included in S3.

In S31, texture data corresponding to the rendered picture is acquired, and one frame of the picture is coded into multiple data packets.

When the server driver of the server streaming software is notified that the event of rendering is completed, the server driver finds the corresponding texture data in the video memory through a texture address transmitted by the data interface, i.e., data of one frame of the picture, and the one frame of the picture is coded into multiple data packets.

In the embodiment of the present disclosure, a dedicated library for video coding and decoding provided by Avida, which is an NvCodec library, is adopted. When initializing, the NvCodec library are notified of the coding format and the picture format in advance. In an embodiment of the present disclosure, the data is coded by using an H. 264 standard. As for the picture format, pictures in an NV_ENC_BUFFERFORMAT_ABGR format are used, in a current frame, and the NvCodec library codes one frame of the picture into multiple small data packets as required.

In S32, the multiple coded data packets are sent to the VR device for decoding and displaying.

When the coding is finished, the server driver of the server streaming software sends the multiple coded data packets to the client streaming software installed on the VR device, and then the client streaming software transmits the coded data packets to the VR device. After the VR device receives the data of one complete frame, the VR device decodes the received data packets to form a complete picture on the VR device and displays. The method of the VR device displaying the picture and related hardware can adopt any existing method and hardware, and no specific requirement is made here.

In the video streaming method provided by the above embodiment, the server streaming software acquires the positioning data and the posture data. The acquired positioning data and the acquired posture data are sent to the VR application software so that the VR application software renders the picture. The rendered picture is acquired and sent to the VR device so that the VR device displays the picture. The server streaming software is installed on the terminal, so that only the terminal is enabled to be responsible for running the VR application software, and the VR device itself is merely responsible for the picture display. Moreover, through wirelessly connecting the terminal to the VR device by a 5G router, the technical problem of "VR wireless" that puzzles many manufacturers is solved.

Third Embodiment

A video streaming system used in the third embodiment is the same as that in the first embodiment. The system includes a terminal and a VR device (such as a VR all-in-one machine and the like), which is not redundantly described here. During the use of the video streaming system, if data is sent into application platform software without restriction, that is, whenever a piece of data is received, it is directly put into the application platform software, since each device has a different frequency (for example, a frequency of the VR device for data transmission is X, while a frequency of the application platform software for data acquisition is Y, where X is not equal to Y), a delay time is different, which eventually leads to problems such as picture delay and picture jitter.

To solve such problems, it is necessary to make a reasonable estimation on the data, so that the rendered picture is more stable, smooth and fluent. Therefore, in the video streaming system in the embodiment of the present disclosure, a positioning and prediction unit is installed on the terminal. The positioning and prediction unit is configured in the server driver of the server streaming software in a form of software. The positioning and prediction unit is configured to predict posture data required by the application platform software for picture rendering according to the posture data of the VR device, and the application platform software renders a real-time picture according to the predicted data. The positioning and prediction unit acquiring the prediction posture data so that the posture data of the application platform software of a next moment can be accurately predicted, thus reducing picture jitter and display delay. The prediction posture data of the next occasion is rendered in VR application software, and the terminal transmits the rendered picture to client streaming software in the VR device so that the VR device displays the rendered picture by using an UDP through the server streaming software. Such processing possess is illustrated below in detail.

To enable the picture of the VR application software to be streamed into the VR device, such requirement is realized according to a system architecture shown in FIG. 1. In the streaming system shown in FIG. 1, several core modules required to be implemented are: a server driver of the server streaming software installed on the terminal, the VR device, the client streaming software installed on the VR device and the positioning and prediction unit. The VR device is configured to acquire the posture data and transmit the data to the server driver. The client streaming software and the server driver are configured to perform data transmission and processing. The positioning and prediction unit is configured to predict the posture data required by the application platform software for rendering the picture according to the posture data sent by the VR device. The positioning and prediction unit is in the server driver of the serve streaming software.

Figure 5:
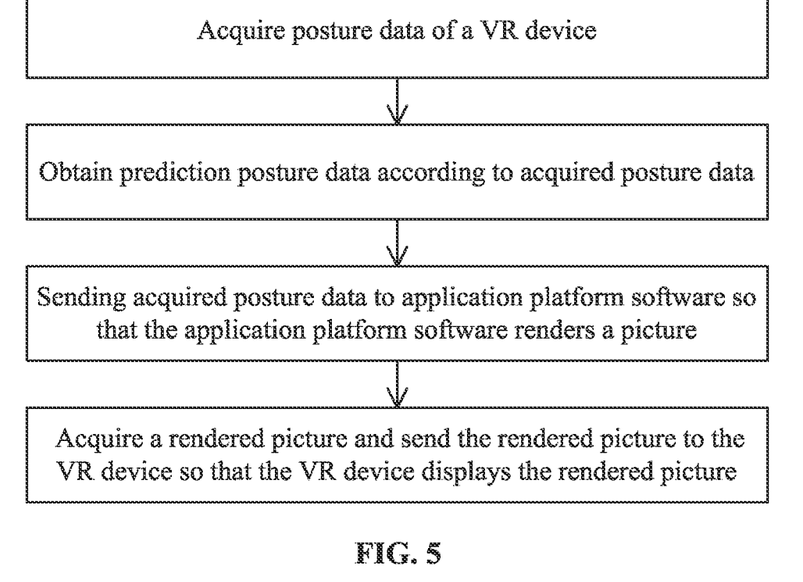
FIG. 5 is a flowchart of a video streaming method in a third embodiment of the present disclosure.

FIG. 5 is a flowchart of a video streaming method in a third embodiment of the present disclosure. The implementation process of video streaming is described below in detail.

In S1, posture data of a VR device is acquired.

The posture data of the VR device is acquired by a sensor installed on the VR device, such as such as a nine-shaft sensor, an inertial sensor, a six-shaft sensor, a gyroscope, a magnetometer and the like. The posture data of other parts of the user, such as the hand, is obtained by the sensor installed on the handle of the positioning and tracking device.

The posture data of the VR device is transmitted to client streaming software installed on the VR device, and then is sent to a server driver of server streaming software by using a user datagram protocol (UDP) through the client streaming software. The server driver acquires the posture data of the VR device.

In S2, prediction posture data is acquired according to the acquired posture data.

Figure 6:
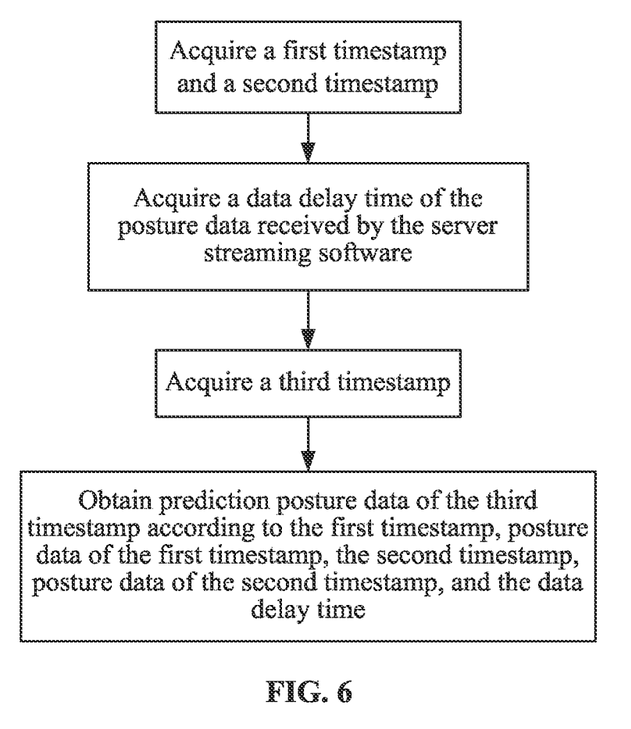
FIG. 6 is a flowchart of predicting posture data by a positioning and prediction unit in a third embodiment of the present disclosure.

To provide a good use experience, the posture data sent by the VR device must be reasonably estimated, so that the rendered picture is more stable, smooth and fluent. Therefore, in the video streaming system in the embodiment of the present disclosure, the server driver includes a positioning and prediction unit. The positioning and prediction unit is configured in the server driver of the server streaming software in a form of software. As shown in FIG. 6, the positioning and prediction unit obtains the prediction posture data according to the acquired posture data, which specifically includes steps described below.

In S21, a first timestamp and a second timestamp are acquired. The first timestamp is a time when a server streaming software receives i-th posture data, and the second timestamp is a time when the server streaming software receives (i+1)-th posture data.

In the embodiment of the present disclosure, the positioning and prediction unit obtains a first timestamp $T_i$ (i=1, 2 . . . N, where N is a positive integer, N>=1), and the first timestamp $T_i$ is a timestamp obtained by signing the received i-th posture data sent by the VR device and the time at which the posture data is received. The positioning and prediction unit obtains a second timestamp $T_{i+1}$ (i=1, 2 . . . N, where N is a positive integer, N>=1), and the second timestamp $T_{i+1}$ is a timestamp obtained by signing the received (i+1)-th posture data sent by the VR device and the time at which the posture data is received.

In S22, a data delay time M of the posture data received by the server streaming software.

When implementing video streaming among different devices, a frequency of capturing data when application platform software renders is X Hz, and a frequency of the VR device sending the posture data is Y Hz. The data delay time M is a total delay time from movement generating to the server driver receiving the posture data.

The data delay time M may be obtained by the following formula:

$$M=T0+(t2-t1)+\Delta T.$$

T0 is a delay time from the movement generating to the sensor acquiring this movement. Specifically, for the VR device worn on a user's head, this delay time is a delay time of the posture data from a time when the user's head moves to a time when the sensor acquires the head movement. t1 is a time when the sensor acquires the posture data, t2 is the time when the posture data is transmitted to the server streaming software, and $\Delta T$ is a network delay time.

Figure 7:
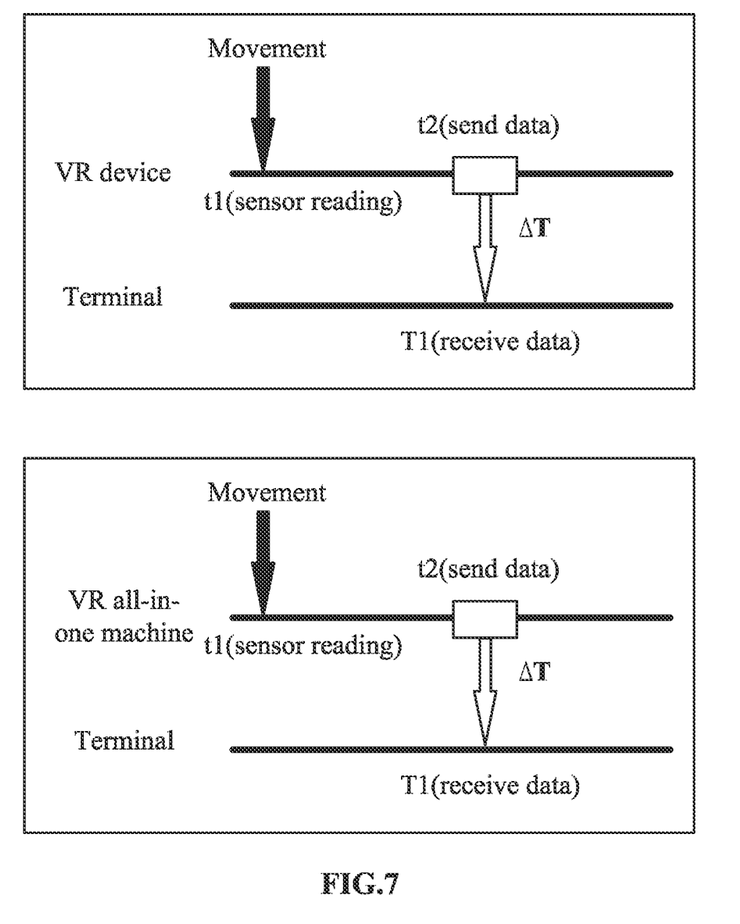
FIG. 7 is a schematic diagram showing that a data delay time is caused when a picture of VR application software is streamed to a VR device in a third embodiment of the present disclosure.

FIG. 7 shows all data delay times included in a process from the movement generating to the server driver obtaining the data.

In the third embodiment, during the whole video streaming process, since the data delay time $\Delta T$ caused by the network delay time is fixed and is only be calculated for one time. The process of acquiring the data delay time caused by the network delay time specifically includes the following steps.

In S221, at a first sending time t3, the server driver of the server streaming software transmits request data to the VR device.

In S222, at a first receiving time t4, the server driver of the server streaming software receives a reply message sent by the VR device.

In S223, the network delay time is obtained according to the first receiving time and the first sending time.

The network delay time adopts the following formula:

$$\Delta T = (t4 - t3)/2.$$

The network delay time ΔT can be obtained through a requesting time and a responding time between the server driver and the VR device.

In S23, a third timestamp is acquired, where the third timestamp is a time when the application platform software takes a sample from the server streaming software.

A frequency of the VR device for data transmission is X, while a frequency of the application platform software for data acquisition is Y, where X is not equal to Y. After acquiring the i-th posture data and (i+1)-th posture data sent by the VR device to the server streaming software and the corresponding the first timestamp $T_i$ and the second timestamp $T_{i+1}$, the positioning and prediction unit acquires a third timestamp $V_j'$. The third timestamp $V_j'$ is a time when the application platform software takes a sample from the server streaming software.

In S24, prediction posture data of the third timestamp is obtained according to the first timestamp and posture data of the first timestamp, the second timestamp and posture data of the second timestamp, and the data delay time.

According to the first timestamp and the posture data acquired by the first timestamp, the second timestamp and the posture data acquired by the second timestamp, and the data delay time, the prediction posture data of the third timestamp is obtained by adopting the following formula:

$$V_j' = V_i + (V_{i+1} - V_i) \times \frac{(T_j' - T_i) + M}{T_{i+1} - T_i}.$$

$V_j'$ is a prediction posture data of a time $T_j'$, $T_i$ is the first timestamp, $V_i$ is a posture data of the first timestamp, $T_{i+1}$ is the second timestamp, $V_{i+1}$ is the posture data of the second timestamp, $T_j'$ is the third timestamp, and M is the data delay time.

In the above manner, the posture data at the time $T_j'$ can be accurately predicted, thereby reducing the picture jitter and display delay.

In S3, the prediction posture data is sent to the VR application software so that the VR application software renders the picture.

The predicted posture data at the time $T_j'$ is transmitted to the application platform software so that the application platform software renders the picture, and the rendered picture is transmitted to the VR device so that the VR device displays the rendered picture, which specifically includes the following steps.

In S31, the prediction posture data is sent to a data interface and transmitted the prediction posture data to the VR application software via the data interface.

The prediction posture data obtained by the positioning and prediction unit in the server driver of the server streaming software is transmitted to the data interface. The VR application software in the application platform software SteamVR uses the application engine and integrates an SDK provided by the data interface OpenVR. The data interface OpenVR transmits the posture data to the VR application software.

In S32, according to the prediction posture data obtained by the VR application software and an application logic, rendered picture contents are determined through the application engine and the picture is rendered.

The VR application software transmits data, according to the posture data and the application logic obtained by the VR application software, to the application engine to obtain the exact rendered picture contents and render the picture. The application engine may be an Unreal Engine 4, a Universal 3D and the like.

Optionally, the control information acquired by the server driver of the server streaming software is also transmitted to the VR application software so that the VR application software renders the picture. The control information acquired by the server streaming software is sent to the data interface OpenVR and transmitted to the VR application software through the data interface OpenVR. The VR application software also transmits data, according to the obtained control information, to the application engine to obtain the exact rendered picture contents and render the picture.

In the embodiment of the present disclosure, the application engine stores the rendered data in the video memory of the video card, such as the video memory of a Nvidia video card, and notifies the VR application software that the picture has been rendered, the VR application software notifies the data interface OpenVR, and the data interface OpenVR notifies the server driver of the server streaming software that an event of rendering is completed.

In S4, the rendered picture is acquired and sent to the VR device so that the VR device displays the rendered picture.

In the embodiment of the present disclosure, the following steps are specifically included in S4.

In S41, texture data corresponding to the rendered picture is acquired, and one frame of the picture is coded into multiple data packets.

When the server driver of the server streaming software is notified that the event of rendering is completed, the server driver finds the corresponding texture data in the video memory through a texture address transmitted by the data interface OpenVR, i.e., data of one frame of the picture, and the one frame of the picture is coded into multiple data packets.

In the embodiment of the present disclosure, a dedicated library for video coding and decoding provided by Avida, which is an NvCodec library, is adopted. When initializing, the NvCodec library are notified of the coding format and the picture format in advance. In an embodiment of the present disclosure, the data is coded by using an H. 264 standard. As for the picture format, pictures in an NV_ENC_BUFFER_FORMAT_ABGR format are used, in a current frame, and the NvCodec library codes one frame of the picture into multiple small data packets as required.

In S42, the multiple coded data packets are sent to the VR device for decoding and displaying.

When the coding is finished, the server driver of the server streaming software sends the multiple coded data packets to the client streaming software installed on the VR device, and then the client streaming software transmits the coded data packets to the VR device. After the VR device receives the data of one complete frame, the VR device decodes the received data packets to form a complete picture on the VR device and displays.

The method of the VR device displaying the picture and related hardware can adopt any existing method and hardware, and no specific requirement is made here.

In the embodiment of the present disclosure, the server streaming software installed on the terminal may acquire control information sent by the VR device, and the control information may come from the VR device, or from a controller matched with the VR device and the like. The server streaming software sends the prediction posture data to the application platform software so that the application platform software renders the picture, at the same time, the server streaming software also sends the control information to the application platform software so that the application platform software renders the picture.

To sum up, in the video streaming method provided by the above embodiment, by calculating the data delay time of the posture data received by the server streaming software, combining with the posture data sent by the VR device, the posture data when the application platform software renders the picture is predicted, the picture is rendered according to the prediction posture data, and the rendered picture is sent to the VR device so that the VR device displays the rendered picture. This method can more accurately predict the posture data, thereby reducing picture jitter and display delay.

Fourth Embodiment

Figure 8:
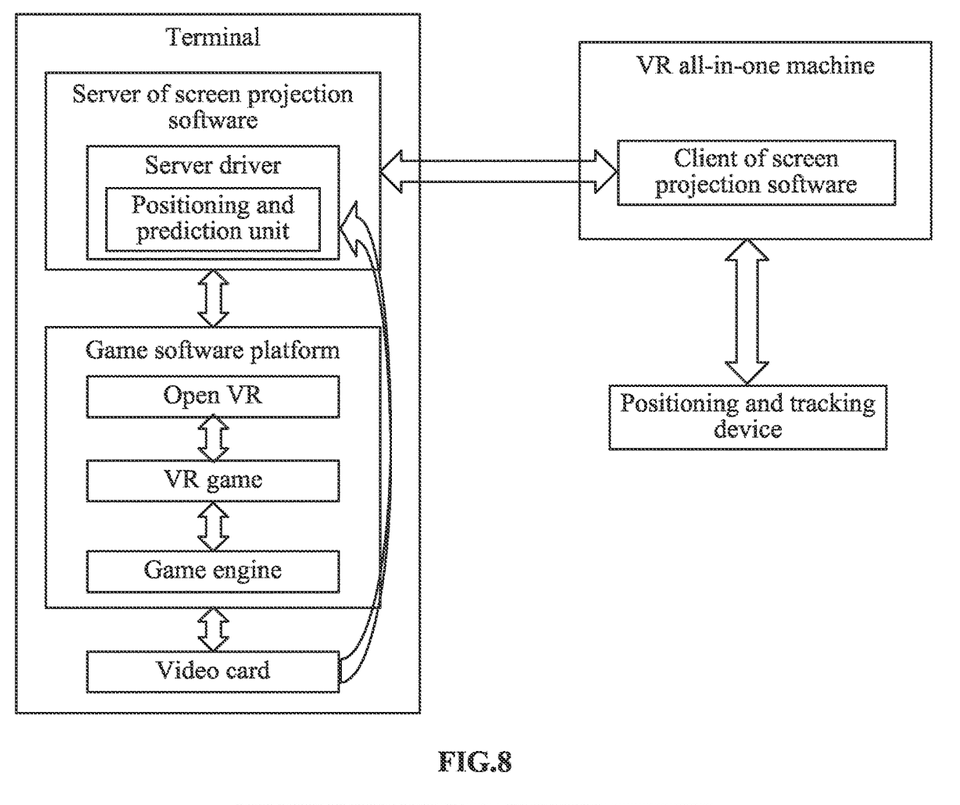
FIG. 8 is a schematic diagram illustrating a structure of a video streaming system in a fourth embodiment of the present disclosure.

As shown in FIG. 8, a video streaming system in the fourth embodiment of the present disclosure includes a terminal, a VR device, and a positioning and tracking device. Application platform software and server streaming software are installed on the terminal. In the embodiment of the present disclosure, the terminal is illustrated by taking a PC as an example, and the terminal may also be a tablet computer, a smart TV, a smart phone and the like having data processing capabilities. Exemplarily, the application platform software installed on the PC is Steam VR platform software (or a corresponding APP on the smart phone), or may also be other application platforms such as a VIVEPORT platform, a HYPEREAL platform, an Ant Vision VR application software platform, a Dapeng Assistant, a Tencent WEGAME, an OGP application platform and the like. The VR application software in the application platform software uses an application engine (such as an Unreal Engine 4, a Universal 3D and the like) and integrates an SDK provided by a data interface OpenVR, such as the SDK provided by the data interface OpenVR of the Steam VR platform software, so that the picture of the VR application software can be seen on the displayer of the PC. The server streaming software can be configured to be an A end of NOLOHOME software.

The server streaming software includes two parts. One of the two parts is a control interface and the other of the two parts is a server driver. The server driver is optionally a dll file, and can also be another implementation form, such as the SDK, an API file and the like. When the application platform software such as Steam VR platform software, is started on the PC, the above server driver is loaded accordingly.

Client streaming software is installed on the VR device, for example, the client streaming software can be configured to be a B end of the NOLOHOME software. The VR device may be a VR all-in-one machine, the client streaming software is installed in a system of the VR all-in-one machine, the pictures are also displayed on the display screen of the VR all-in-one machine, and the sensor is fixedly installed on the VR all-in-one machine. The VR device may also be a mobile VR device, the client streaming software is installed in the smart phone of the mobile VR device, and the pictures can be displayed on the smart phone of the mobile VR device or on the display screen of the mobile VR device. The sensor may be fixedly installed on a shell of the mobile VR device or be a sensor borrowed from the smart phone installed in the mobile VR device.

The PC and the VR device are connected in a wired/wireless way. When the PC and the VR device are connected wirelessly, optionally, the PC and the VR device operate in a wireless local area network (WLAN) or a fifth-generation (5G) communication environment. Since 5G communication environment has characteristics of high speed and low delay, an actual delay generated by the PC and the VR device in the 5G communication environment can be basically negligible.

In the existing art, most VR devices only can watch videos, that is, most VR devices only have a three degree-of-freedom posture tracking (pitching, rolling and yawing). If a six degree-of-freedom head-hand position positioning (including pitching, rolling, yawing and spatial X, Y and Z coordinates) needs to be performed, a positioning and tracking device needs to be equipped. The positioning and tracking device may include a handle and a locator installed on the VR device. The handle is held in the user's hand and can transmit positioning data to the locator, and then the locator transmits the positioning data of the locator and the positioning data of the handle to the VR device, or both the handle and the locator directly transmit the positioning data to the VR device. The locator may be installed on the VR device internally or externally. In a case where the locator is installed on the VR device internally, the locator may be integrated and assembled into the locator during the manufacturing process of the VR device. In a case where the locator is placed on the VR device externally, the locator may be externally connected to the VR device in a wired or wireless way. The positioning and tracking device is connected to the VR device through a USB interface and is configured to capture positioning data of the user's head and/or hand. The VR device acquires the positioning data captured by the positioning and tracking device, and then sends the positioning data to the server streaming software on the PC by using an UDP protocol. The server streaming software on the PC sends the positioning data to the application platform software so that the application platform software renders a real-time picture.

To provide a good use experience, if data is sent into application platform software without restriction, that is, whenever a piece of data is received, it is directly put into the application platform software, since each device has a different frequency (for example, a frequency of the VR device for data transmission is X, while a frequency of the application platform software for data acquisition is Y, where X is not equal to Y), a delay time is different, which eventually leads to problems such as picture delay and picture jitter. To solve such problems, it is necessary to make a reasonable estimation on the data, so that the rendered picture is more stable, smooth and fluent. Therefore, in the video streaming system in the embodiment of the present disclosure, a positioning and prediction unit is installed on the terminal. The positioning and prediction unit is configured in the server driver of the server streaming software in a form of software. The positioning and prediction unit is configured to predict posture data required by the application platform software for picture rendering according to the posture data of the VR device, and the application platform software renders a real-time picture according to the predicted data. The positioning and prediction unit acquires the prediction posture data, so that the posture data of the application platform software of a next moment can be accurately predicted, thus reducing picture jitter and display delay. The terminal then, through the client streaming software, transmits the rendered picture to the VR device so that the VR device displays the rendered picture by using the UDP protocol through the server streaming software. This processing process is described in detail below.

In the embodiment of the present disclosure, the VR application software in the application platform software uses an application engine (such as an Unreal Engine 4, a Universal 3D and the like) and integrates an SDK provided by a data interface OpenVR, such as the SDK provided by the data interface OpenVR of the Steam VR platform software, so that the picture of the VR application software can be seen on the displayer of the PC.

To enable the picture of the VR application software to be streamed into the VR device, such requirement is realized according to a system architecture shown in FIG. 8, in the streaming system shown in FIG. 8, several core modules required to be implemented are: a server driver of the server streaming software installed on the terminal, the VR device, the client streaming software installed on the VR device, the positioning and prediction unit and the positioning and tracking device. The positioning and tracking device is configured to capture the positioning data of the user's hand and head. The VR device is configured to acquire the captured positioning data, and then sends the acquired data to the server streaming software. The client streaming software and the server driver are configured to perform data transmission and processing. The positioning and prediction unit is configured to predict, according to the positioning data sent by the VR device, the positioning data required by the application platform software for rendering the picture. The positioning and prediction unit is in the server driver of the serve streaming software.

Figure 9:
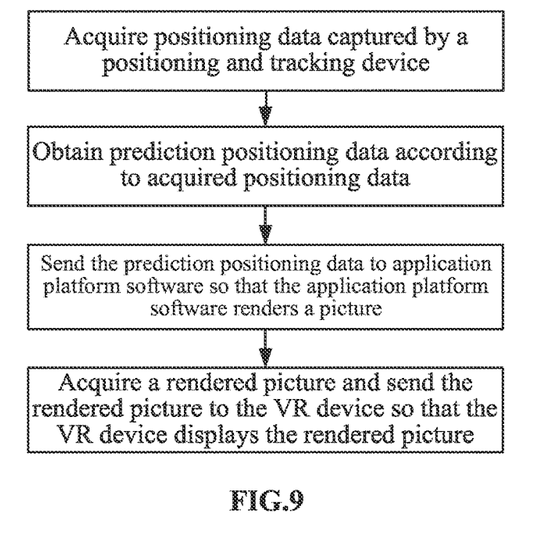
FIG. 9 is a flowchart of a video streaming method in a fourth embodiment of the present disclosure.

FIG. 9 is a flowchart of a video streaming method in a fourth embodiment of the present disclosure. The whole process of video streaming is described below in detail.

In S1, positioning data captured by a positioning and tracking device is acquired. The step in which the positioning data captured by the positioning and tracking device is acquired specifically includes steps described below.

In S11, positioning data of a user is acquired through the positioning and tracking device.

The positioning and tracking device may include a locator installed on the VR device, and a handle held on the user's hand and the like. By obtaining the positioning data of the locator and/or the handle, the positioning data of the user's head and/or hand can be obtained. The locator may be installed on the VR device internally or externally. In a case where the locator is installed on the VR device internally, the locator may be integrated and assembled into the locator during the manufacturing process of the VR device. In a case where the locator is placed on the VR device externally, the locator may be externally connected to the VR device in a wired or wireless way. The positioning data of the user may be obtained through a three-dimensional spatial positioning method and system disclosed by a patent application No. 201610917518.0, and may also be obtained by using another known three-dimensional spatial positioning method and system, such as a positioning method of multi-camera and multi-mark points, an SLAM method and the like.

S12, the positioning data captured by the positioning and tracking device is sent to the VR device.

The VR device may read the positioning data in a wired way such as through an OTG data line, and may also read the positioning data in a wireless way, such as through Bluetooth and WiFi. As for a VR all-in-one machine, the data is directly sent to a system of the VR all-in-one machine. As for a mobile VR device, the data may be sent to a smart phone installed in a housing of the mobile VR device.

S13, the positioning data acquired by the VR device is sent to the server streaming software by using the UDP protocol. The VR device transmits the acquired positioning data to the client streaming software installed on the VR device, and then sends the data to the server driver of the server streaming software installed on the terminal by using the UDP protocol. After this step, the server streaming software acquires the positioning data.

Optionally, the server streaming software may also acquire control information, and the control information may also be sent to the server driver of the server streaming software by using the UDP through the client streaming software. The control information may come from the VR device or the positioning and tracking device.

In S2, prediction positioning data is obtained according to acquired positioning data.

Figure 10:
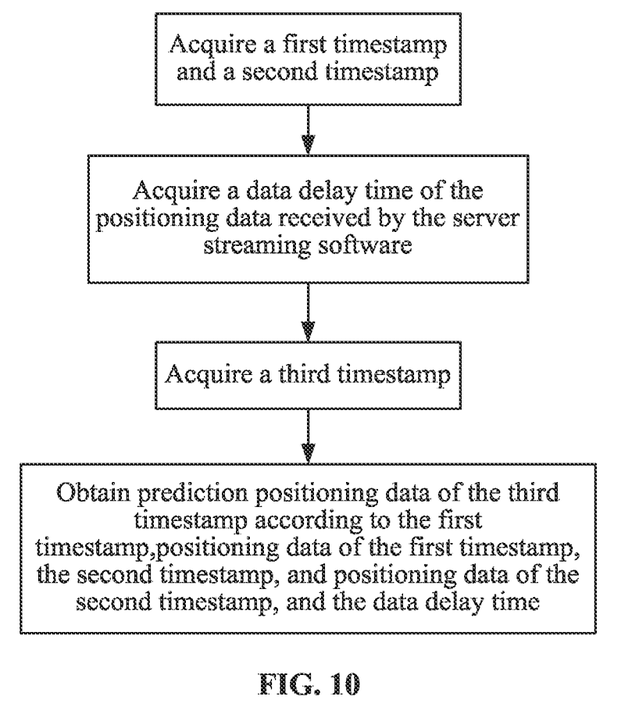
FIG. 10 is a flowchart of predicting positioning data by a positioning and prediction unit in a fourth embodiment of the present disclosure.

To provide a good use experience, the positioning data sent by the VR device must be reasonably estimated, so that the rendered picture is more stable, smooth and fluent. Therefore, in the video streaming system in the embodiment of the present disclosure, the server driver includes a positioning and prediction unit. The positioning and prediction unit is configured in the server driver of the server streaming software in a form of software. As shown in FIG. 10, the positioning and prediction unit obtains the prediction positioning data according to the acquired positioning data, which specifically includes steps described below.

S21, a first timestamp and a second timestamp are acquired. The first timestamp is a time when a server streaming software receives i-th positioning data, and the second timestamp is a time when the server streaming software receives (i+1)-th positioning data.

In the embodiment of the present disclosure, the positioning and prediction unit obtains a first timestamp $T_i$ (i=1, 2 ... N, where N is a positive integer, and N>=1), and the first timestamp $T_i$ is a timestamp obtained by signing the received i-th positioning data sent by the VR device and the time at which the positioning data is received. The positioning and prediction unit obtains a second timestamp $T_{i+1}$ (i=1, 2 ... N, where N is a positive integer, and N>=1), and the second timestamp $T_{i+1}$ is a timestamp obtained by signing the received (i+1) positioning data sent by the VR device and the time at which the positioning data is received.

In S22, a data delay time M of the positioning data received by the server streaming software.

As implementing video streaming among different devices, a frequency of capturing data when application platform software renders is X Hz, and a frequency of the VR device sending the posture data is Y Hz. The data delay time M is a total delay time from movement generating to the server driver receiving the posture data.

The data delay time M may be obtained by the following formula:

$$M = T0 + (t2 - t1) + \Delta T.$$

T0 is a delay time from the movement generating to the sensor acquiring this movement. t1 is a time when the sensor acquires the positioning data, t2 is the time when the positioning data is transmitted to the server streaming software, and $\Delta T$ is a network delay time.

Figure 11:
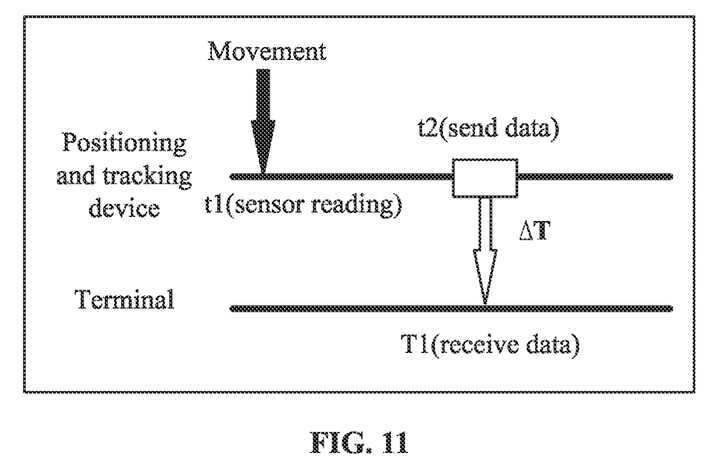
FIG. 11 is a schematic diagram showing that a data delay time is caused when a picture of VR application software is streamed to a VR device in a fourth embodiment of the present disclosure.

FIG. 11 shows all data delay times included in a process from the movement generating to the server driver obtaining the data.

In the fourth embodiment, during the whole video streaming process, since the data delay time ΔT caused by the network delay time is fixed and is only calculated for one time. The process of acquiring the data delay time caused by the network delay time specifically includes the following steps.

In S221, at a first sending time t3, the server driver of the server streaming software sends request data through the VR device or the positioning and tracking device.

In S222: at a first receiving time t4, the server driver of the server streaming software receives a reply message sent by the VR device or the positioning and tracking device.

In S234, the network delay time is obtained according to the first receiving time and the first sending time. The network delay time adopts the following formula:

$$\Delta T = (t4-t3)/2.$$

The network delay time ΔT can be obtained through a requesting time and a responding time between the server driver and the VR device or the positioning and tracking device.

The total delay time M from movement generating to the server driver can be determined, i.e. the data delay time M is:

$$M = 20 + (t2-t1) + (t4-t3)/2.$$

In S23, a third timestamp is acquired, where the third timestamp is a time when the application platform software takes a sample from the server streaming software.

A frequency of the VR device for data transmission is X, while a frequency of the application platform software for data acquisition is Y, where X is not equal to Y. After acquiring the i-th positioning data and (i+1)-th positioning data sent by the VR device to the server streaming software and the corresponding the first timestamp $T_i$ and the second timestamp $T_{i+1}$, the positioning and prediction unit acquires a third timestamp $V_j'$. The third timestamp $V_j'$ is a time when the application platform software takes a sample from the server streaming software.

In S24, prediction positioning data of the third timestamp is obtained according to the first timestamp and positioning data of the first timestamp, the second timestamp and positioning data of the second timestamp, and the data delay time.

According to the first timestamp and the positioning data acquired by the first timestamp, the second timestamp and the positioning data acquired by the second timestamp, and the data delay time, predicted error data of the third timestamp is obtained, by adopting the following formula:

$$V_j' = V_i + (V_{i+1} - V_i) \times \frac{(T_j' - T_i) + M}{T_{i+1} - T_i}.$$

$V_j'$ is prediction positioning data of a time $T_j'$, $T_i$ is the first timestamp, $V_i$ is a positioning data of the first timestamp, $T_{i+1}$ is the second timestamp, $V_{i+1}$ is the positioning data of the second timestamp, $T_j'$ is the third timestamp, and M is the data delay time.

In the above manner, the posture data at the time $T_j'$ can be accurately predicted, thereby reducing the picture jitter and display delay.

In S3, the prediction positioning data is sent to the VR application software so that the VR application software renders the picture.

The prediction positioning data at the time $T_j'$ is transmitted to the application platform software so that the application platform software renders the picture, and the rendered picture is transmitted to the VR device so that the VR device displays the rendered picture.

The step in which the application platform software renders the picture according to the prediction positioning data and sends the rendered picture to the VR device so that the VR device displays the rendered picture specifically includes the following steps.

In S31, the prediction positioning data is sent to a data interface and transmitted the prediction positioning data to the VR application software via the data interface.

The prediction positioning data acquired by the positioning and prediction unit in the server driver of the server streaming software is transmitted to the data interface. The VR application software in the application platform software SteamVR uses the application engine and integrates an SDK provided by the data interface OpenVR. The data interface OpenVR transmits the posture data to the VR application software.

In S32, according to the prediction positioning data obtained by the VR application software and an application logic, picture contents rendered by the application engine are determined and the picture is rendered.

The VR application software transmits data, according to the positioning data and the application logic obtained by the VR application software, to the application engine to obtain the exact rendered picture contents and render the picture. The application engine may be an Unreal Engine 4, a Universal 3D and the like.

Optionally, the control information acquired by the server driver of the server streaming software is also transmitted to the VR application software so that the VR application software renders the picture. The control information acquired by the server streaming software is sent to the data interface OpenVR and transmitted to the VR application software through the data interface OpenVR. The VR application software also transmits data, according to the obtained control information, to the application engine to obtain the exact rendered picture contents and render the picture.

In the embodiment of the present disclosure, the application engine stores the rendered data in the video memory of the video card, such as the video memory of a Nvidia video card, and notifies the VR application software that the picture has been rendered, the VR application software notifies the data interface OpenVR, and the data interface OpenVR notifies the server driver of the server streaming software that an event of rendering is completed.

In S4, the rendered picture is acquired and sent to the VR device so that the VR device displays the rendered picture.

In the embodiment of the present disclosure, the following steps are specifically included in S4.

In S41, texture data corresponding to the rendered picture is acquired, and one frame of the picture is coded into multiple data packets.

When the server driver of the server streaming software is notified that the event of rendering is completed, the server driver finds the corresponding texture data in the video memory through a texture address transmitted by the data interface OpenVR, i.e., data of one frame of the picture, and the one frame of the picture is coded into multiple data packets.

In the embodiment of the present disclosure, a dedicated library for video coding and decoding provided by Avida, which is an NvCodec library, is adopted. When initializing, the NvCodec library are notified of the coding format and the picture format in advance. In an embodiment of the present disclosure, the data is coded by using an H. 264 standard. As for the picture format, pictures in an NV_ENC_BUFFERFORMAT_ABGR format are used, and in a current frame, the NvCodec library codes one frame of the picture into multiple small data packets as required.

In S42, the multiple coded data packets are sent to the VR device for decoding and displaying.

When the coding is finished, the server driver of the server streaming software sends the multiple coded data packets to the client streaming software installed on the VR device, and then the client streaming software transmits the coded data packets to the VR device. After the VR device receives the data of one complete frame, the VR device decodes the received data packets to form a complete picture on the VR device and displays.

The method of the VR device displaying the picture and related hardware can adopt any existing method and hardware, and no specific requirement is made here.

In the embodiment of the present disclosure, the server streaming software installed on the terminal may acquire the control information sent by the VR device, and the control information may come from the VR device, or from the positioning and tracking device. The server streaming software sends the prediction positioning data to the application platform software so that the application platform software renders the picture, at the same time, the server streaming software also sends the control information to the application platform software so that the application platform software renders the picture.

To sum up, in the video streaming method provided by the above embodiment, by calculating the data delay time of the positioning data received by the server streaming software, according to the positioning data captured by the positioning and tracking device, the positioning data when the application platform software renders the picture is predicted, the picture is rendered according to the predicted data, and the rendered picture is sent to the VR device so that the VR device displays the rendered picture. This method can more accurately predict the posture data, thereby reducing picture jitter and display delay.

In addition, the embodiment of the present disclosure also provides a video streaming apparatus. The apparatus includes a processor and a memory, the processor is configured to execute a program which is used for implementing the video streaming and is stored in the memory to implement the above video streaming method. The memory here stores one or more programs used for implementing the video streaming. The memory may include a volatile memory, such as a random access memory (RAM); or may include a non-volatile memory, such as a read only memory (ROM), a flash memory, a hard disk drive (HDD), a solid state drive (SSD). The memory may include a combination of the above memories. When one or more programs used for implementing the video streaming in the memory are executed by the processor, all or part of the steps of the video streaming method described in the above method embodiments can be implemented.

What is claimed is:

1. A video streaming method, comprising:
acquiring, by a terminal, posture data of a VR device;
obtaining, by the terminal, prediction posture data according to acquired posture data;
sending, by the terminal, the prediction posture data to application platform software so that the application platform software renders a picture; and
acquiring, by the terminal, a rendered picture and sending the rendered picture to the VR device so that the VR device displays the rendered picture;
wherein obtaining, by the terminal, the prediction posture data according to the acquired posture data comprises:
acquiring, by the terminal, a first timestamp and a second timestamp, wherein the first timestamp is a time when server streaming software receives i-th posture data, and the second timestamp is a time when the server streaming software receives (i+1)-th posture data;
acquiring, by the terminal, a data delay time of the posture data received by the server streaming software;
acquiring, by the terminal, a third timestamp, wherein the third timestamp is a time when the application platform software takes a sample from the server streaming software; and
obtaining, by the terminal, prediction posture data of the third timestamp according to the first timestamp, posture data of the first timestamp, the second timestamp, posture data of the second timestamp, and the data delay time.

2. The video streaming method of claim 1, wherein the data delay time is obtained by a follow formula:

$$M=T0+(t2-t1)+\Delta T; \text{ and}$$

wherein M is the data delay time, t1 is a time when a sensor acquires posture data, t2 is a time when the posture data is sent to the server streaming software, and $\Delta T$ is a network delay time.

3. The video streaming method of claim 1, wherein in obtaining, by the terminal, the prediction posture data of the third timestamp according to the first timestamp, the posture data of the first timestamp, the second timestamp, the posture data of the second timestamp, and the data delay time, a following formula is adopted:

$$V'_j = V_i + (V_{i+1} - V_i) \times \frac{(T'_j - T_i) + M}{T_{i+1} - T_i},$$

wherein $V_j'$ is prediction posture data of a time $T_j'$, $T_i$ is the first timestamp, $V_i$ is the posture data of the first timestamp, $T_{i+1}$ is the second timestamp, $V_{i+1}$ is the posture data of the second timestamp, $T_j'$ is the third timestamp, and M is the data delay time.

4. A video streaming method, comprising:
acquiring, by a VR device, positioning data captured by a positioning and tracking device;
obtaining, by a terminal, prediction positioning data according to acquired positioning data;
sending, by the terminal, the prediction positioning data to application platform software so that the application platform software renders a picture; and
acquiring, by the terminal, a rendered picture and sending the rendered picture to the VR device so that the VR device displays the rendered picture;
wherein obtaining, by the terminal, the prediction positioning data according to the acquired positioning data comprises:
acquiring, by the terminal, a first timestamp and a second timestamp, wherein the first timestamp is a time when server streaming software receives i-th positioning data, and the second timestamp is a time when the server streaming software receives (i+1)-th positioning data;

acquiring, by the terminal, a data delay time of the positioning data received by the server streaming software;

acquiring, by the terminal, a third timestamp, wherein the third timestamp is a time when the application platform software takes a sample from the server streaming software; and obtaining, by the terminal, prediction positioning data of the third timestamp according to the first timestamp, and positioning data of the first timestamp, the second timestamp, positioning data of the second timestamp, and the data delay time.

5. The video streaming method of claim 4, wherein the data delay time is obtained by a follow formula: M=T0+ (t2−t1)+ΔT; and wherein M is the data delay time, t1 is a time when a sensor acquires positioning data, t2 is a time when posture data is sent to the server streaming software, and ΔT is a network delay time.

6. The video streaming method of claim 4, wherein in obtaining, by the terminal, the prediction positioning data of the third timestamp according to the first timestamp, the positioning data of the first timestamp, the second timestamp, the positioning data of the second timestamp, and the data delay time, a following formula is adopted:

$$V'_j = V_i + (V_{i+1} - V_i) \times \frac{(T'_j - T_i) + M}{T_{i+1} - T_i},$$

and wherein $V'_j$ is prediction positioning data of a time $T'_j$, $T_i$ is the first timestamp, $V_i$ is the positioning data of the first timestamp, $T_{i+1}$ is the second timestamp, $V_{i+1}$ is the positioning data of the second timestamp, $T'_j$ is the third timestamp, and M is the data delay time.

\* \* \* \* \*